United States Patent
Macias-Valadez et al.

(10) Patent No.: US 8,521,028 B2
(45) Date of Patent: Aug. 27, 2013

(54) METHOD AND SYSTEM FOR HIGH PRECISION GPS APPLICATIONS

(75) Inventors: Daniel Macias-Valadez, Québec (CA); Rock Santerre, Saint-Augustin-de-Desmaures (CA); Sophie LaRochelle, Québec (CA)

(73) Assignee: Universite Laval, Quebec (CA)

( * ) Notice: Subject to any disclaimer, the term of this patent is extended or adjusted under 35 U.S.C. 154(b) by 159 days.

(21) Appl. No.: 13/258,864

(22) PCT Filed: Mar. 22, 2010

(86) PCT No.: PCT/CA2010/000433
§ 371 (c)(1),
(2), (4) Date: Sep. 22, 2011

(87) PCT Pub. No.: WO2010/108269
PCT Pub. Date: Sep. 30, 2010

(65) Prior Publication Data
US 2012/0020670 A1    Jan. 26, 2012

Related U.S. Application Data

(60) Provisional application No. 61/162,320, filed on Mar. 22, 2009.

(51) Int. Cl.
*H04B 10/00*        (2013.01)

(52) U.S. Cl.
USPC .......................................... 398/115; 398/118

(58) Field of Classification Search
USPC ................................. 398/115–118
See application file for complete search history.

(56) References Cited

U.S. PATENT DOCUMENTS

| | | | | |
|---|---|---|---|---|
| 4,287,606 A | * | 9/1981 | Frosch et al. | 398/158 |
| 5,031,234 A | * | 7/1991 | Primas et al. | 398/154 |
| 5,818,385 A | * | 10/1998 | Bartholomew | 342/372 |
| 6,433,866 B1 | * | 8/2002 | Nichols | 356/141.1 |
| 6,917,328 B2 | * | 7/2005 | Rabinowitz et al. | 342/357.29 |

(Continued)

FOREIGN PATENT DOCUMENTS

EP    1752783 A2    2/2007

OTHER PUBLICATIONS

Santerre, Rock and Beutler, Gerhard; A Proposed Gps Method With Multi-Antennae and Single Receiver; Bulletin Geodesique; 1993; 210-223; 67; Springer-Verlag.

(Continued)

*Primary Examiner* — Agustin Bello
(74) *Attorney, Agent, or Firm* — Hovey Williams LLP

(57) ABSTRACT

A GPS system for obtaining data from a GPS signal received at a plurality of antenna stations, each antenna station being connected to a common receiver station through an optical fiber link. The system includes a light generating module at the receiver station generating an optical reference signal, and an antenna station module at each antenna station. The antenna station modules modulate the optical reference signal according to the GPS signal received, obtaining a twice modulated optical signal, and sending this signal to the receiver station. Finally, an output module is provided at the receiver station, this module being used for extracting the GPS signal and the oscillating reference signal, calibrating in real time the optical fiber links based on a phase comparison, and processing the GPS signal from the antenna stations, taking into account the real time calibration of the optical fiber links.

14 Claims, 6 Drawing Sheets

(56) References Cited

U.S. PATENT DOCUMENTS

| | | | |
|---|---|---|---|
| 7,292,185 B2* | 11/2007 | Whitehead et al. | 342/357.36 |
| 7,315,278 B1* | 1/2008 | Bauregger et al. | 342/357.27 |
| 7,554,964 B2* | 6/2009 | Bolgiano et al. | 370/342 |
| 7,679,727 B2* | 3/2010 | Benz et al. | 356/4.01 |
| 8,138,975 B2* | 3/2012 | Bull et al. | 342/450 |
| 8,248,988 B2* | 8/2012 | Bolgiano et al. | 370/320 |
| 8,254,865 B2* | 8/2012 | Soul et al. | 455/230 |
| 8,312,771 B2* | 11/2012 | Randall et al. | 73/627 |
| 2010/0277339 A1* | 11/2010 | Cyganski et al. | 340/825.49 |
| 2012/0020670 A1* | 1/2012 | Macias-Valadez et al. | 398/116 |

OTHER PUBLICATIONS

Mechels, S.E., Schlager, J.B. and Franzen, D.L.; High-Resolution Differential-Mode Delay Measurements in Optical Fibers Using a Frequency-Domain Phase-Shift Technique; IEEE Photonics Technology Letters; Jun. 1997; 794-796; vol. 9, No. 6; IEEE Xplore.

Mac Doran, P.F., Feuerstein, R.J. And Schreiner, W.S.; GPS Spread Spectrum Signal Transmission Over Fiber Optic Links; IEEE Transactions on Geoscience and Remote Sensing; Sep. 1992; 1073-1076; vol. 30, No. 5; IEEE.

Dennis, T. and Williams, P.A.; Achieving High Absolute Accuracy for Group-Delay Measurements Using the Modulation Phase-Shift Technique; Journal of Lightwave Technology; Nov. 2005; 3748-3754; vol. 23, No. 11; IEEE.

Costa, B., Mazzoni, D., Puleo, M. and Vezzoni, E.; Phase Shift Technique for the Measurement of Chromatic Dispersion in Optical Fibers Using Led's; IEEE Transactions on Microwave Theory and Techniques; Oct. 1982; 1497-1503; vol. MTT-30, No. 10; IEEE.

Macias-Valadez, D., Larochelle, S., Santerre, R. and Filion, B.; Fiber Optic Synchronisation Architecture for High Precision GPS Applications; 2008; 3 pp.; OCIS codes: 060.5625 Radio frequency photonics; Optical Society of America.

Cliché, J.-F. and Shillue, B.; Precision Timing Control for Radioastronomy: Maintaining Femtosecond Synchronization in the Atacama Large Millimeter Array; IEEE Control Systems Magazine; Feb. 2006; 19-26.

* cited by examiner

METHOD AND SYSTEM FOR HIGH PRECISION GPS APPLICATIONS

RELATED APPLICATIONS

This is a national stage application under 35 U.S.C. §371 of International Application No. PCT/CA2010/000433, filed 22 Mar. 2010, which claims priority from U.S. Provisional Application No. 61/162,320, filed 22 Mar. 2009. The disclosures of the above-referenced applications are hereby incorporated by reference in their entirety.

FIELD OF THE INVENTION

The present invention generally relates to high precision GPS applications.

BACKGROUND

A well known issue in GPS positioning is that the determination of the vertical coordinate—the height—is two to three times less precise than the horizontal ones. Two main reasons explain this fact: the GPS satellite sky distribution, in which no satellite is visible under the horizon, and the receiver clock error, which is highly correlated with the height component (R. Santerre, "Impact of GPS satellite sky distribution," *Manuscripta Geodaetica*, 16(1), 28-53, (1991)).

To achieve better precision of the vertical coordinate in relative GPS positioning, a novel GPS architecture in which all the antennas are connected to a single GPS receiver is proposed in Santerre et al. (R. Santerre, and G. Beutler. "A proposed GPS method with multi-antennae and single receiver," *Bulletin Géodésique*, 67(4), 210-223, (1993)). With this configuration, because only one GPS receiver is used, receiver clock errors are eliminated by single differentiation between antennas. Simulations predict two to three times improvement in the precision of the vertical position determination. Reaching millimetric vertical precision is important for applications such as deformation monitoring of civil engineering structures, e.g. dams or bridges. In this context, two main issues must be resolved to successfully implement the multi-antenna-to-one-receiver system. Firstly, as opposed to conventional GPS survey in which each antenna is separated by only a few metres from its associated receiver, in this case the distance between the antennas and the single receiver can reach several kilometres. Secondly, height precision improvement can only be reached if the relative propagation delay between the antennas and the receiver is monitored at the millimetre level. Optical fiber links are important components to address these issues. Several manufacturers already offer GPS-over-fiber solutions but these do not include real time monitoring of propagation delays. Additionally, since high precision applications rely on carrier phase measurements, phase stability is important. Therefore, a proper choice of components and measurement of phase stability must be performed. However, the major drawback of the system disclosed relates to the calibration of the system. In the system envisioned by Santerre et al, calibration of relative signal delay throughout the hardware (antenna, cables, receiver) is performed once, before the final deployment, using the zero-baseline configuration, where only one antenna is used, and the use of suitable low-thermal dilatation optical fiber is recommended so that variations in the fiber links lengths due to temperature changes are minimized. Such specialty fibers are however costly and not always convenient, which may limit the practicality of this system.

Systems taking into account fiber length thermal variations are known in other fields, such as the high precision timing control of a radiotelescope, as exemplified by Cliche et al. (J. Cliche, and B. Shillue, "Precision timing control for radioastronomy: maintaining femtosecond synchronization in the Atacama Large Millimeter Array", IEEE Control Systems Magazine, 26(1), pp. 19-26 (2006)). Cliche et al. propose a real time calibration system for an optical fiber link to be used in radioastronomy. The system uses two synchronized laser (a master and a slave) in order to perform interferometry measurements and to adjust an optical fiber length in real time. The goal is to have a femtosecond synchronisation system. However, even if such system achieve a very high accuracy over long distance (up to 18 km), the cost of building and maintaining such system is very high and not appropriate or viable for most high precision GPS applications.

There is therefore a need for an improved architecture which addresses at least some of the above-mentioned drawbacks of prior art systems.

SUMMARY OF THE INVENTION

In accordance with a first aspect of the invention, there is provided a method for obtaining GPS data from a GPS signal received at a plurality of antenna stations, each antenna station being connected to a common receiver station through an optical fiber link, the method involving a real time calibration of said optical fiber links and comprising the steps of:

generating an optical signal at the receiver station and modulating the same according to an oscillating reference signal, thereby obtaining an optical reference signal;

sending a portion of the optical reference signal to each one of the plurality of antenna stations through the corresponding optical fiber link;

at each antenna station, modulating the optical reference signal according to the GPS signal received at said antenna station, thereby obtaining a twice modulated optical signal;

sending the twice modulated optical signal from each antenna station to the receiver station through the corresponding optical fiber link.

Then, at the receiver station, the method comprises the steps of:

extracting the GPS signal and the oscillating reference signal from the twice modulated optical signal received from each of said antenna stations;

computing the real time calibration of said optical fiber links based on a phase comparison of the oscillating reference signals from different antenna stations; and processing the GPS signal from said antenna stations taking into account said real time calibration of the optical fiber links, thereby obtaining said GPS data.

In accordance with another aspect of the invention, there is provided a GPS system for obtaining GPS data from a GPS signal received at a plurality of antenna stations, each antenna station being connected to a common receiver station through an optical fiber link. The system comprises a light generating module provided at the receiver station. The light generating module comprising a light source generating an optical signal, light modulating means modulating the optical signal according to an oscillating reference signal, thereby obtaining an optical reference signal, and an optical assembly dividing the optical reference signal into portions thereof and sending each portion of the optical reference signal to one of the plurality of antenna stations through the corresponding optical fiber link.

The system also comprises a plurality of antenna station modules, each provided at a to corresponding one of the antenna stations. Each antenna station module modulates the optical reference signal according to the GPS signal received at the antenna station. A twice modulated optical signal is thereby obtained. This twice modulated optical signal is sent to the receiver station through the corresponding optical fiber link.

There is also an output module provided at the receiver station, comprising:

extracting means for extracting the GPS signal and the oscillating reference signal from the twice modulated optical signal received from each of the antenna stations;

calibrating means for computing a real time calibration of said optical fiber links based on a phase comparison of the oscillating reference signals from different remote antenna stations; and processing means for processing the GPS signal from the antenna stations taking into account the real time calibration of the optical fiber links, thereby obtaining the GPS data.

In particular embodiments, the optical reference signal is used firstly to perform a down conversion to Intermediate Frequency (IF) of the RF GPS signal from the corresponding antenna at each antenna station, and secondly to serve as an optical carrier modulated by the down converted GPS signal. The resulting signal is send back through the optical fiber links to the local receiver station where it is detected. The detected twice modulated optical signal is used both to extract the GPS data and to obtain differential delay measurements between the fiber links to different remote antenna stations through comparison of the corresponding carrier phase information.

Advantageously, embodiments of the present invention provide a novel GPS-over-fiber architecture that simultaneously fulfills two objectives: GPS signal transportation over fiber with minimal phase degradation and real time differential delay measurements between fibers with millimetre precision. In implementing this architecture, system costs may be reduced by favouring directly modulated semiconductor devices for downlink/uplink transmission of the calibration and GPS signals. Embodiments of the invention could be useful for a variety of applications, for example the monitoring of deformation of civil engineering structures, such as bridges, dams, or the like, the monitoring of crustal or terrain movements or GPS attitude (orientation) measurements, where a multi-antenna configuration is also used and where a better precision could be reached with this approach.

Other features and advantages of the present invention will be better understood upon reading of preferred embodiments thereof with reference to the appended drawings.

DESCRIPTION OF PREFERRED
EMBODIMENTS OF THE INVENTION

Figure 1A:
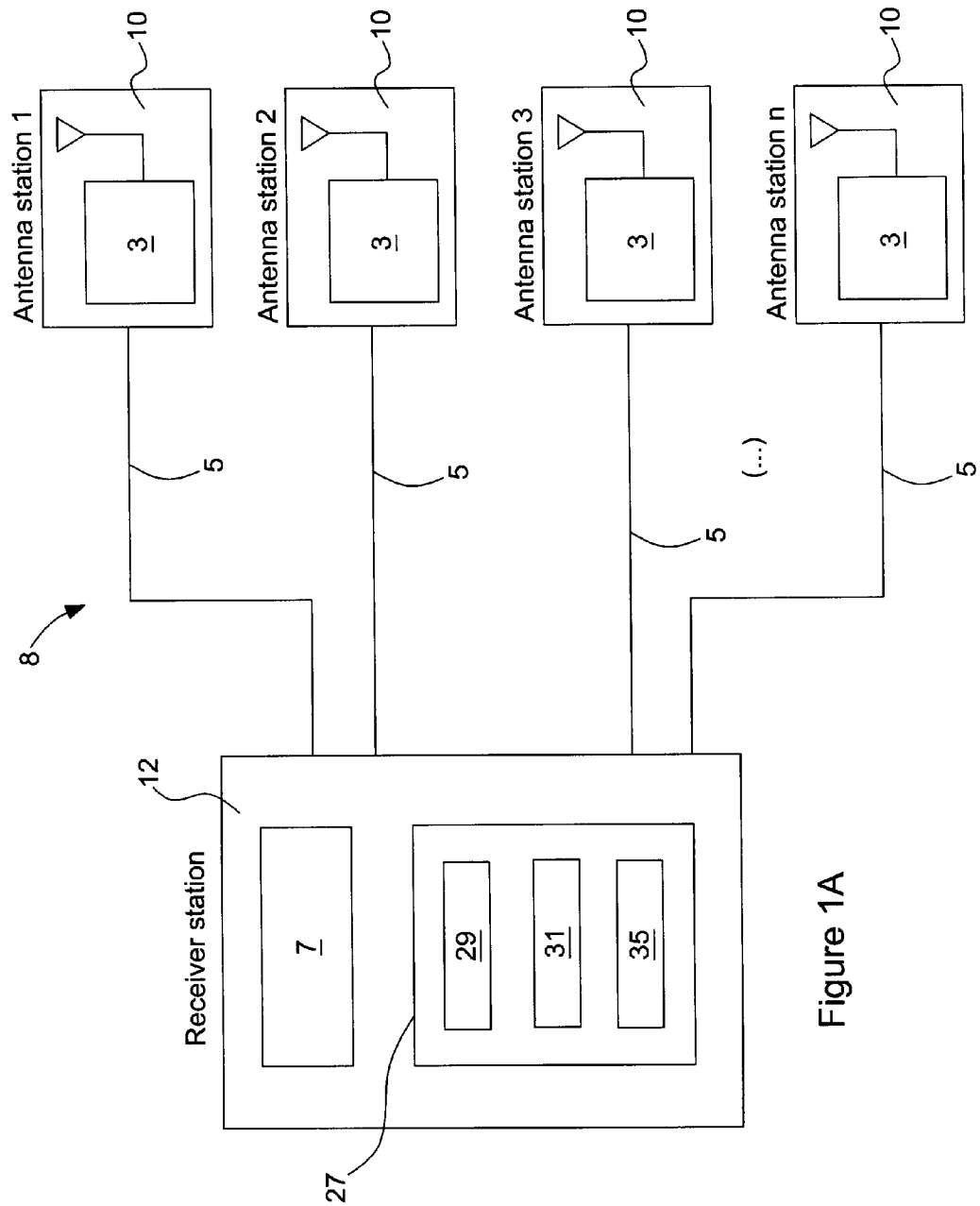
FIGS. 1A and 1B are schematical representations of systems according to an embodiment of the invention.
Figure 1B:
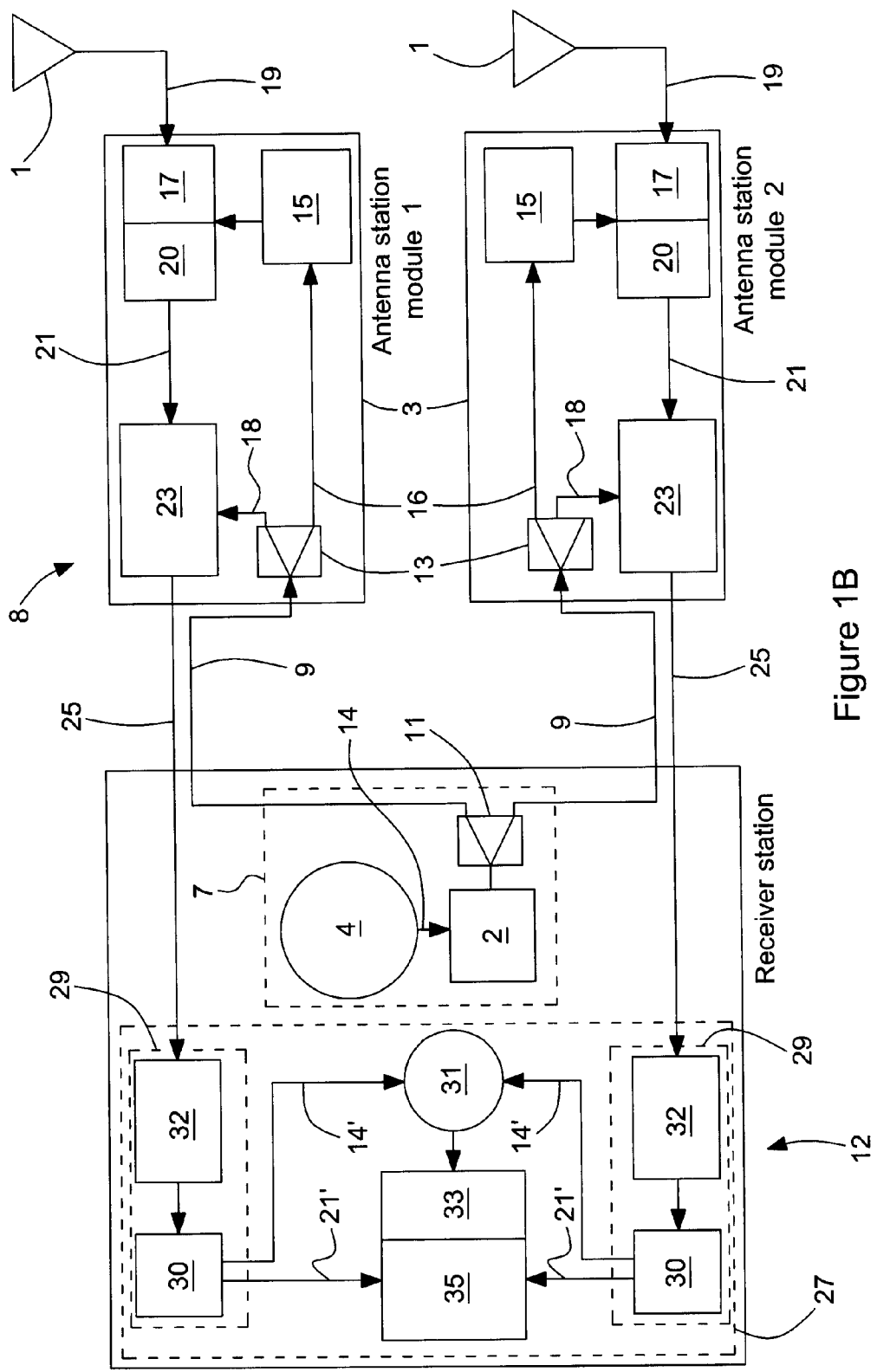

Referring to FIG. 1A and FIG. 1B, there is shown an architecture for GPS-over-fiber and real time relative delay monitoring according to an embodiment of the invention. The GPS system 8 includes a plurality of antenna stations 10 with corresponding GPS antennas 1 to receive the GPS signals, and one receiver station 12 to process the information. As will be readily understood by one skilled in the art, the concepts disclosed herein may be applied to systems including two or any greater number of antennas without departing from the scope of the present invention.

Generally speaking, high precision GPS data from a GPS signal is obtained as follow. The GPS signal is emanating from a GPS satellite, standard or otherwise, orbiting the Earth. The GPS signal is received at the plurality of antenna stations 10. For example, two such antenna stations 10 might be used as in FIG. 1A and the experimental data shown further below. The expression "antenna station" is understood herein to refer to a particular location remote from the receiver station 12 at which is provided at least one antenna 1 apt to receive a GPS signal, and associated signal processing components referred to herein globally as an "antenna station module" 3. One skilled in the art will understand that, in practice, the antenna 1 and antenna station module 3 could be embodied by a variety of different components arranged in any appropriate manner. Each antenna station 10 is connected to the common receiver station 12 through an optical fiber link 5, such fiber link being, for example, a conventional fiber such as the SMF-28 optical fiber. It will however be understood that any type of specialty optical fiber may alternatively be used, single mode or multimode or polarization maintaining, made of any suitable materials such as pure silica, doped silica, composite glasses or sapphire, without departing from the scope of the present invention. Typically, for some applications, the fiber length would not exceed a few kilometres (2-3), but of course much greater distance could be covered in other applications without departing from the scope of the present invention.

A light generating module 7 is provided at the receiver station 12. This module includes a light source 2 generating an optical signal. This light source 2 can be a laser or any other appropriate light source which can generate a signal apt to propagate through the optical fiber links 5. Light modulating means are used to modulate the optical signal according to an oscillating reference signal 14, thereby resulting in an optical reference signal 9. The light modulating means may be embodied by any device or combination of devices and/or component which are adapted to change the amplitude of the light signal generated by the light source 2 according to the oscillating reference signal. In one exemplary embodiment of the invention, the light source 2 may be embodied by a distributed feedback laser (DFB) at which emits a light signal at a wavelength of 1540 nm, and the modulating means includes an oscillator generator 4 which generates the oscillating signal at a frequency of 1.55142 GHz (RF frequency). Of course, any appropriate modulating frequency may be used depending on the frequency of the GPS signal and other technical considerations, taking into consideration non-linear and dispersive effects which may arise at higher frequencies. In one embodiment, the oscillating reference signal 14 from the oscillator may be directly coupled to the light source 2, varying the input current of the light source 2 so that the light signal generated thereby has an amplitude which is directly modulated by the oscillating reference signal 14. Alternatively, the light modulating means may also include an external light modulator, such as an acousto-optic or electro-optic amplitude modulator, which is connected to the oscillator to receive the oscillating signal as input and allow light through accordingly. The light modulator is disposed in the path of the light signal from the light source to modulate the light signal outputted thereby.

One thus obtains an optical reference signal 9. The light generating module further includes an optical assembly 11 dividing the optical reference signal 9 into portions thereof and sending each portion of the optical reference signal 9 to one of the plurality of antenna stations 10 through the corresponding optical fiber link 5. Such an optical assembly 11 can be made of any optical arrangement suitable for the corresponding number of antennas and may include one or more optical components apt to divide, direct, shape, focus or otherwise affect a light beam. Preferably, the optical assembly 11 includes one or more beam splitters to separate the modulated reference signal into two or more components, each being launched into the optical fiber leading to one of the remote antenna stations. In the illustrated embodiment of FIG. 1B, the optical assembly includes a 50/50 beam splitter 13 as the GPS system shown therein includes two antenna stations and associated fiber links.

The GPS system 8 further includes a plurality of antenna station modules 3 each provided at a corresponding one of the antenna stations. The general function of each antenna station module 3 is to modulate the optical reference signal 9, received from the receiver station 12 through the corresponding optical fiber link 5, according to the GPS signal received by the antenna 1 of this antenna station. A "twice modulated optical signal" 25, is therefore obtained, that is, a signal incorporating the modulation information from both the oscillating signal and the GPS signal, and sent to the receiver station through the corresponding optical fiber link 5.

In the illustrated embodiment of FIG. 1B, each antenna station module 3 preferably includes an optical 50/50 splitter 13, or any equivalent optical apparatus, which separates or splits the portion of the optical reference signal 9 received from the receiver station 12 into first and second components 16 and 18. Although a 50/50 splitter is advantageously use, the first and second components need not by of equal power and different proportions could be used. The first component 16 is preferably converted to an equivalent electrical signal, by means of an appropriate detector 15 such as a photodetector. The resulting signal is used for down converting, the RF 1575.42 MHz L1 GPS signal 19 coming from the antenna. In the illustrated embodiment of FIG. 1B, the L1 (1575.42 MHz) GPS signal is used but the system could potentially use other GPS signals (present and future) such as L2 (1227.6 MHz) and L5 (1176.45 MHz) or even signals from other GNSS systems such as Galileo, GLONASS, Compass or other ones. Down converting means are provided for this purpose, such as a down converting mixer 17. In other words, the GPS signal and electrical equivalent of the optical reference signal are multipled to produce a signal having a frequency corresponding to the substraction of their respective frequencies. The resulting signal, typically at an Intermediate Frequency (IF), is therefore an IF GPS signal 21 incorporating the GPS information from the original RF GPS signal 19. The IF GPS signal 21 is preferably amplified by a low noise amplifier 20. Down conversion is preferred before amplification of the GPS signal, which has a typical RF power of −130 dBm at the antenna. In the described embodiment, after down conversion and amplification, the IF GPS signal 21 is now at 24 MHz.

Each antenna station module 3 preferably further includes modulating means for modulating the second component 18 of the optical reference signal 9 with the down converted GPS signal 21, to obtain the twice modulated optical signal 25. Preferably, this is accomplished by using the IF GPS signal 21 to modulate the electrical DC current to a Semiconductor Optical Amplifier (SOA) 23, disposed in the path of the second component 18. It is known in the art that direct modulation of a SOA 23 could result in high quality transmission of ROF (Radio Over Fiber) signal if the amplifier is operated in saturation. An additional benefit of the use of the SOA 23 as modulator is its low polarization sensitivity compared to other external modulators such as LiNbO$_3$.

However, in some embodiment other appropriated devices such as an acousto-optic or electro-optic modulator may alternatively be used without departing from the scope of the invention. The second component 21 goes to the optical input of the SOA 23 or any other suitable electrical-to-optical apparatus. Thus, at the optical output of the SOA 23, which is used as an external optical modulator, there is a twice modulated optical signal 25 which is modulated both by a 1.55142 GHz signal (coming from the receiver station) and by the GPS-IF signal 21 (generated at the remote antenna station). From the ouput of the SOA 23, the signal goes back to the receiver station 12 by means of the same, or a second, optical fiber link 5.

An output module 27 provided at the receiver station 12. The output module generally includes:
  extracting means 29 for extracting the GPS signal and the oscillating reference signal from the twice modulated optical signal received from each antenna stations;
  calibrating means 31 for computing a real time calibration of the optical fiber links based on a phase comparison of the oscillating reference signals from different remote antenna stations; and
  processing means 35 for processing the GPS IF signal from the antenna stations taking into account said real time calibration of the optical fiber links, thereby obtaining the GPS data.

In the illustrated embodiment, the extracting means include a detector 32 for detecting the incoming twice modulated optical signal 25, therefore converting the twice modulated signal to an electrical equivalent, and filtering means 30 which separate the components of the signal respectively corresponding to the GPS IF signal 21' and the oscillating reference signal 14'. The calibrating means 31 may be embodied by any appropriate system for computing a real time calibration of the optical fiber links 5 based on a phase comparison of the oscillating reference signals from different remote antenna stations is then performed. The calibration is preferably based on a modulated phase shift method (S. E. Mechels, J. B. Schlager, and D. L. Franzen. "High-resolution differential-mode delay measurements in optical fibers using a frequency-domain phase-shift technique," *IEEE Photonics Technology Letters,* 9(6), 794-796, (1997)). By measuring the phase difference between the two received 1.55142 GHz signals traveling on each fiber link to the two or more different remote stations and back, the relative delay can be estimated. Any appropriate electronics may be provided for this purpose, as will be readily understood by one skilled in the art. The voltage out of the phase comparator is preferably monitored continuously with a Data Acquisition device 33. Phase differences of less than 1° (less than 1 mm at 1.5 GHz) can be tracked. Thus, relative millimetric optical fiber length changes can be monitored continuously with this system, providing a real time calibration of the system and alleviating the need for specialty fibers with a stable length despite temperature changes.

The extracted GPS signal 21' is fed to the GPS processing means 35. Processing the GPS signal from the antenna stations is done taking into account the real time calibration of the optical fiber links 5, thereby obtaining the high precision GPS data. The GPS data may be processed according to any known technique. Specialized GPS processing software may use the information from the Data Acquisition device 33 to compensate the propagation delay changes in GPS processing and thus achieve accuracy improvement in vertical positioning at millimetric-level.

Figure 4:
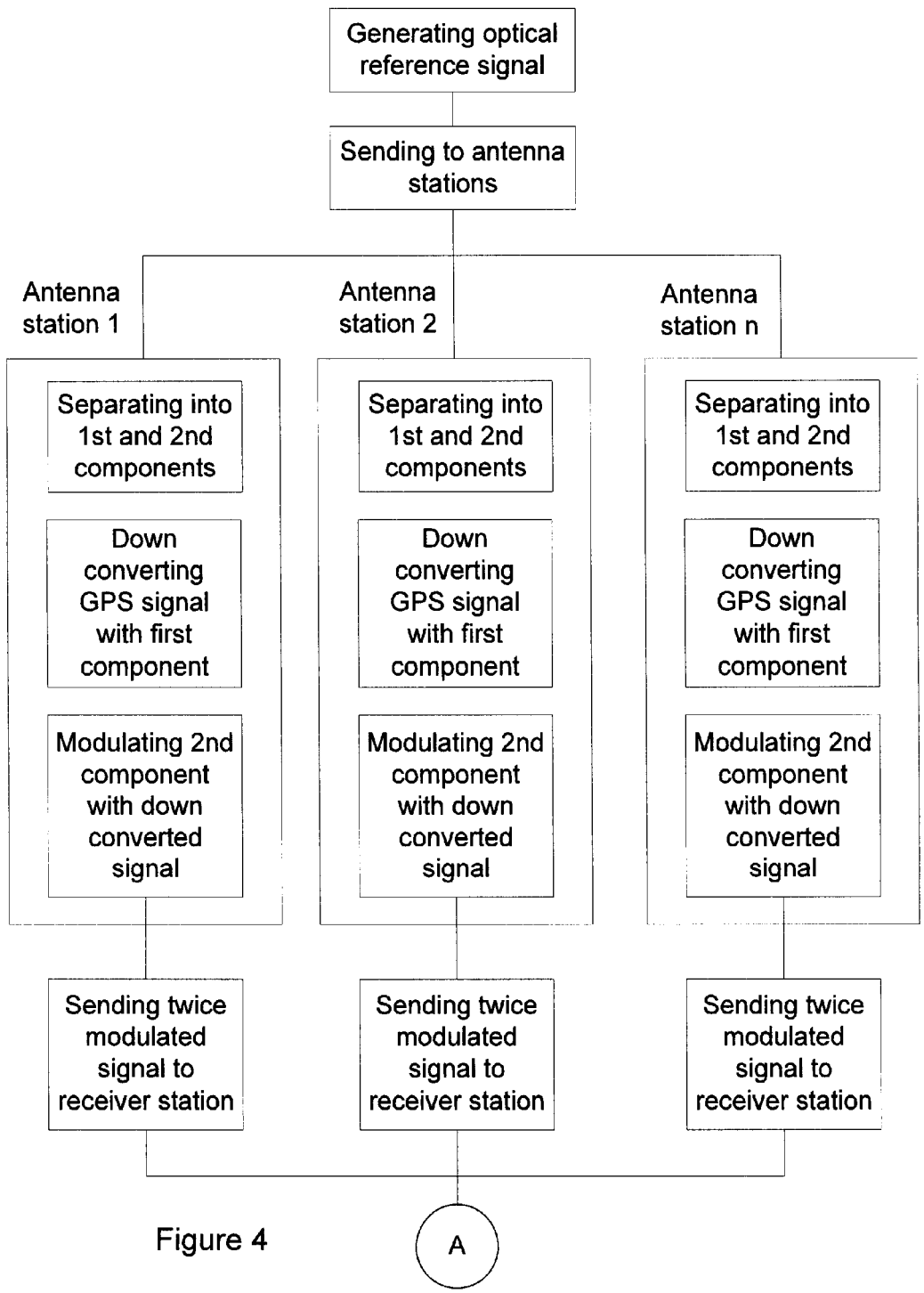
FIG. 4 is a flow chart illustrating a method according to an embodiment of the invention.
Figure 4A:
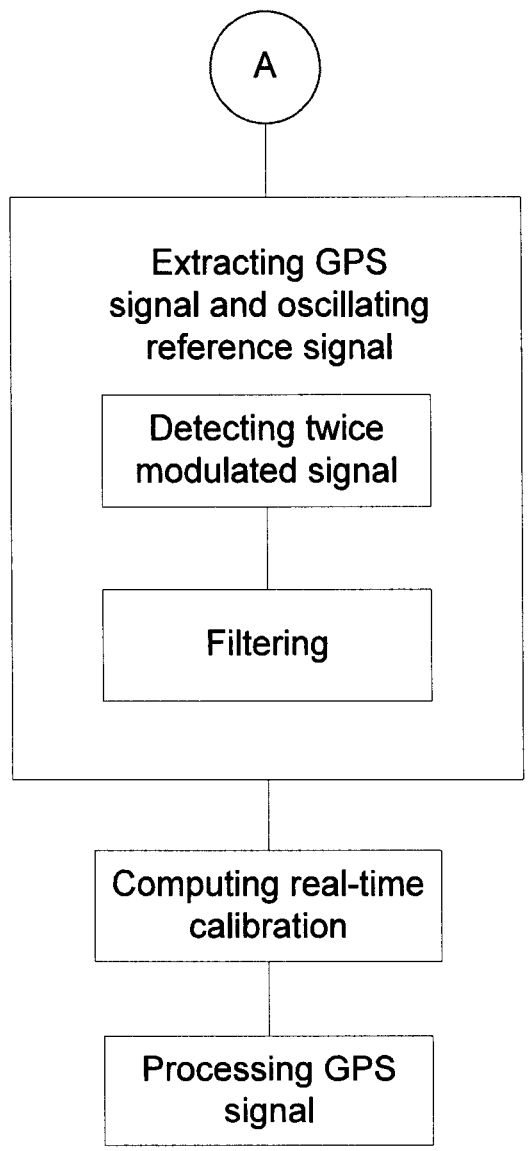
FIG. 4A is a flow chart illustrating a method according to an embodiment of the invention.

In accordance with another aspect of the invention, there is also provided a method for obtaining GPS data from the GPS signal received at the plurality of antenna stations, each antenna station being connected to a common receiver station through an optical fiber link. The method is schematically presented in the flow chart of FIG. 4 and FIG. 4A. The method involves a real time calibration of the optical fiber links. It includes the steps of, at first, generating an optical signal at the receiver station and modulating the same according to an oscillating reference signal, thereby obtaining an optical reference signal. Then, one has to send a portion of the optical reference signal to each one of the plurality of antenna stations through the corresponding optical fiber link.

At each antenna station, the optical reference signal 9 is modulated according to the GPS signal received at the antenna station, thereby obtaining a twice modulated optical signal. To do so, a preferred method would include the sub steps of separating the optical reference signal into first and second components, down converting a RF GPS signal received at the antenna station to Intermediate Frequency IF, using the first component of the separated optical reference signal, and modulating the second component with the down converted GPS signal to obtain the twice modulated optical signal.

Following those steps, the twice modulated optical signal from each antenna station is sent back to the receiver station through the corresponding optical fiber link.

At the receiver station, the twice modulated optical signal is processed in the following manner. At first, the GPS signal and the oscillating reference signal are extracted from the twice modulated optical signal received from each of said antenna stations. To do so, a preferred method would be, at first, detecting the twice modulated optical signal with a photodetector to obtain a twice modulated electrical signal. Then, one would filter the twice modulated electrical signal to separate the GPS signal and the oscillating reference signal.

Finally, one need to compute the real time calibration of the optical fiber links based on a phase comparison of the oscillating reference signals from different antenna stations. With the resulting calibration, the GPS signal from the antenna stations is processed, taking into account the real time calibration of the optical fiber links thereby obtaining the GPS data.

Experimental Results

To demonstrate how the system performs, the inventors deployed a fully operational prototype using two remote stations connected to the receiver station through 2 rolls of 2 km of optical fiber. The purpose is to make a GPS differential positioning between two remote stations, which form a baseline, and compare it with the known, high precision, reference dimensions of the baseline. If the goal is to obtain millimetric GPS positioning and compare it to the reference dimensions of the baseline, then these must be known at better (sub-millimetric) precision levels. To simplify and avoid this tight precision constraint for the reference baseline, we used, in a first experiment, a typical zero baseline configuration, as know from prior art. In this type of configuration, the signal coming from a single antenna is split and fed to the two remote stations. In this case, the 3D reference dimensions of the baseline are strictly (0,0,0) and it is easy to compare the resulting GPS positioning with this (0,0,0) reference.

Figure 2:
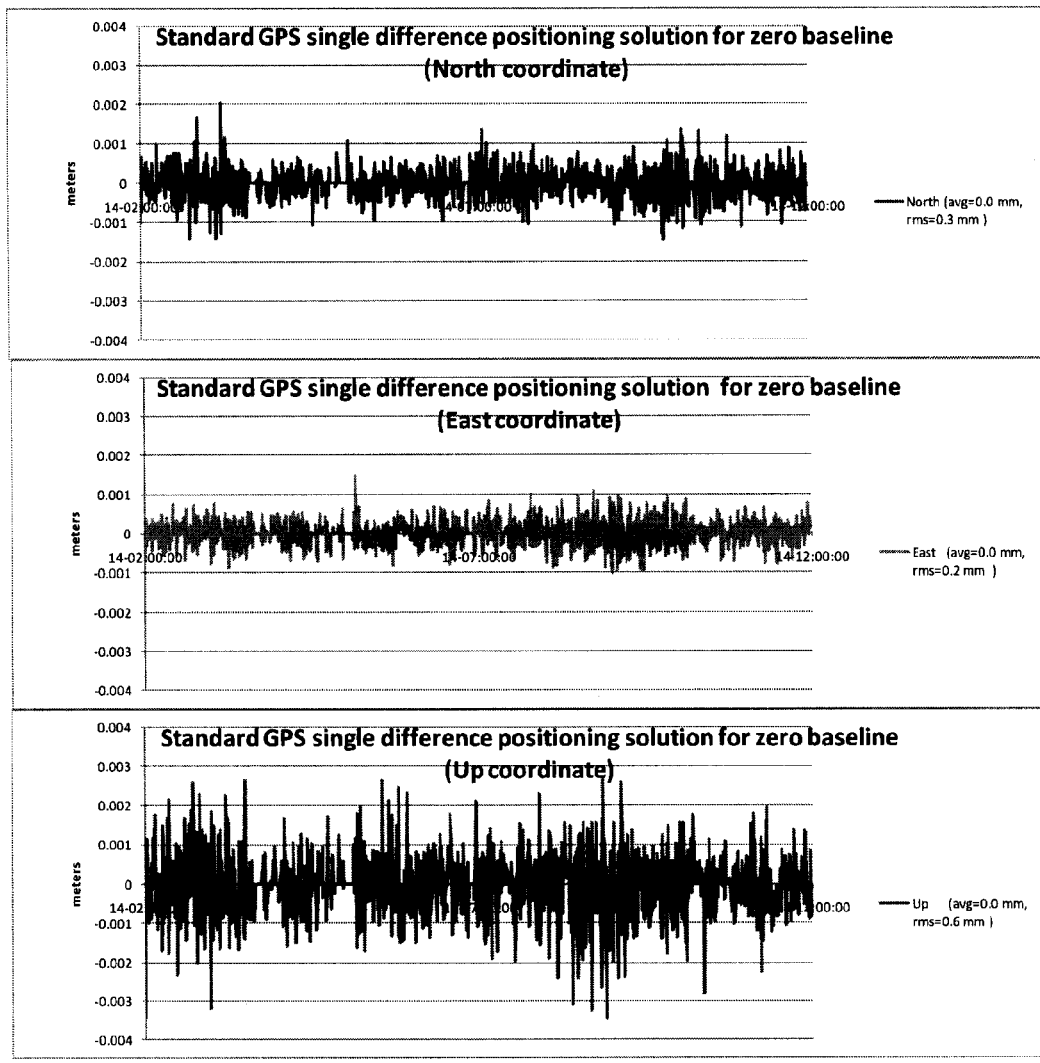
FIG. 2 shows the result for standard GPS positioning for zero baseline.

The results of GPS positioning are first presented without using the measured differential delay on FIG. 2. This case corresponds to the traditional GPS positioning. Here a GPS positioning solution is computed at 30 second intervals during 10 hours. On the graphic, the 3 coordinates in a local North, East, Up (Vertical) (N,E,U) local reference frame are presented. It can clearly be seen that, as expected from prior known technique, the vertical coordinate is 2 to 3 time less precise than the horizontal coordinates. The rms (Root Mean Square) value of the North and East components are respectively 0.3 mm and 0.2 mm where as for the Up component, it is 0.6 mm.

Figure 3:
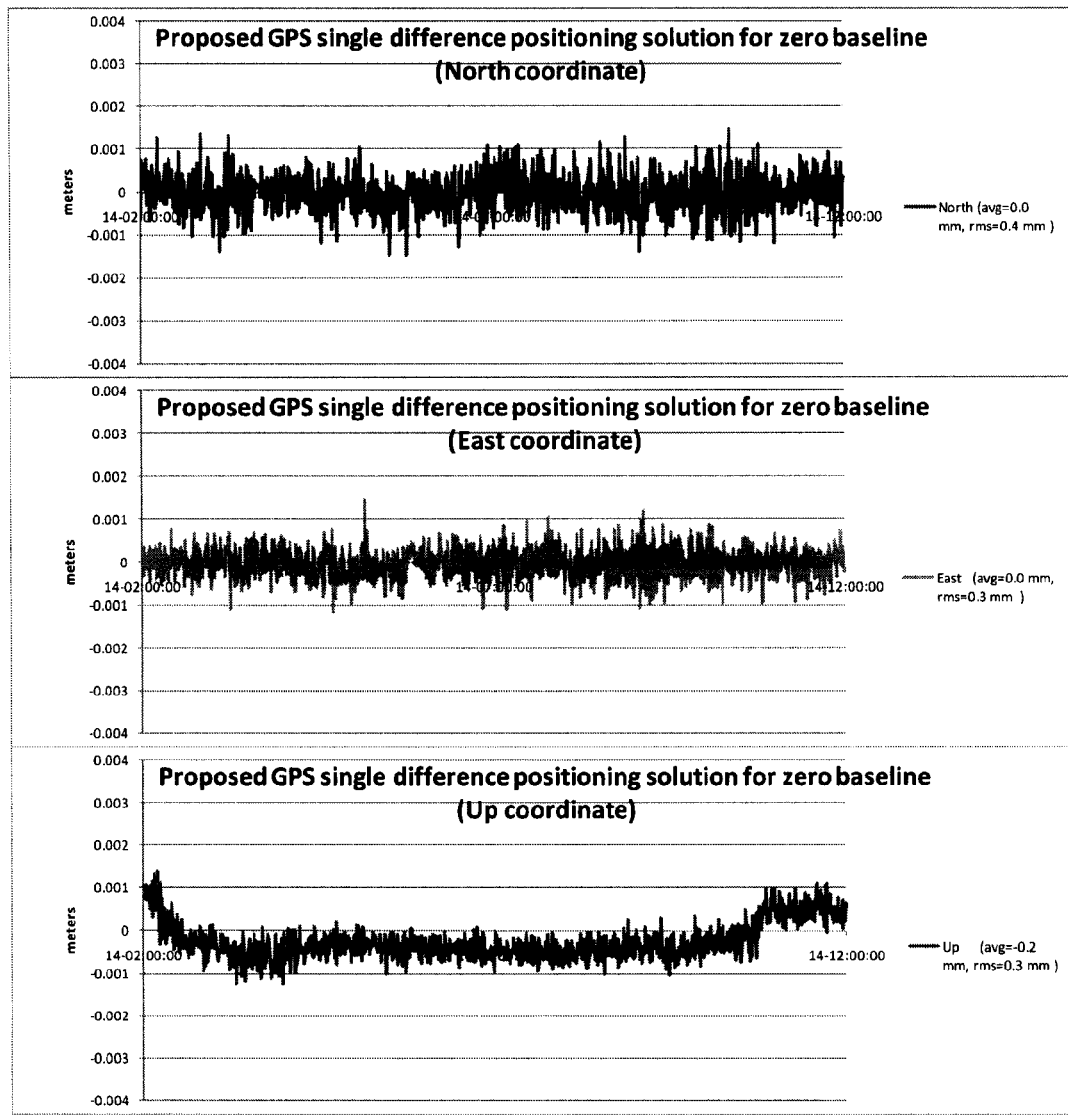
FIG. 3 shows the result for the proposed GPS positioning system for zero baseline.

On the other hand, there is presented on FIG. 3 the results using a method and system according to an embodiment of the present invention, that is, incorporating the measured differential delay into the GPS signal processing. It can be seen that vertical (Up) coordinate rms value is now similar to the rms value of the horizontal (North, East) coordinates, around 0.3 mm in all cases for a zero baseline. Thus, it was achieved, as expected, a two time improvement in the vertical precision.

Of course, numerous modifications could be made to the embodiments described above without departing from the scope of the present invention.

The invention claimed is:

1. A method for obtaining GPS data from a GPS signal received at a plurality of antenna stations, each antenna station being connected to a common receiver station through an optical fiber link, the method involving a real time calibration of said optical fiber links and comprising the steps of:
   a) generating an optical signal at the receiver station and modulating the same according to an oscillating reference signal, thereby obtaining an optical reference signal;
   b) sending a portion of the optical reference signal to each one of the plurality of antenna stations through the corresponding optical fiber link;
   c) at each antenna station, modulating the optical reference signal according to the GPS signal received at said antenna station, thereby obtaining a twice modulated optical signal;
   d) sending the twice modulated optical signal from each antenna station to the receiver station through the corresponding optical fiber link;
   at the receiver station:
   e) extracting the GPS signal and the oscillating reference signal from the twice modulated optical signal received from each of said antenna stations;
   f) computing the real time calibration of said optical fiber links based on a phase comparison of the oscillating reference signals from different antenna stations; and
   g) processing the GPS signal from said antenna stations taking into account said real time calibration of the optical fiber links, thereby obtaining said GPS data.

2. The method of claim 1, wherein step c) comprises the substeps of:
   i) separating the optical reference signal into first and second components;
   ii) down converting a RF GPS signal received at said antenna station to Intermediate Frequency IF using said first component; and
   iii) modulating said second component with the down converted GPS signal to obtain the twice modulated optical signal.

3. The method of claim 1, wherein step e) comprises the substeps of:
  i) detecting the twice modulated optical signal with a photodetector to obtain a twice modulated electrical signal;
  ii) filtering the twice modulated electrical signal to separate the GPS signal and the oscillating reference signal.

4. A GPS system for obtaining GPS data from a GPS signal received at a plurality of antenna stations, each antenna station being connected to a common receiver station through an optical fiber link, the GPS system comprising:
  a light generating module provided at the receiver station, said light generating module comprising a light source generating an optical signal, light modulating means modulating said optical signal according to an oscillating reference signal, thereby obtaining an optical reference signal, and an optical assembly dividing the optical reference signal into portions thereof and sending each portion of the optical reference signal to one of the plurality of antenna stations through the corresponding optical fiber link;
  a plurality of antenna station modules each provided at a corresponding one of said antenna stations, each antenna station module modulating the optical reference signal according to the GPS signal received at said antenna station, thereby obtaining a twice modulated optical signal, and sending the twice modulated optical signal to the receiver station through the corresponding optical fiber link; and
  an output module provided at the receiver station, said output module comprising:
  extracting means for extracting the GPS signal and the oscillating reference signal from the twice modulated optical signal received from each of said antenna stations;
  calibrating means for computing a real time calibration of said optical fiber links based on a phase comparison of the oscillating reference signals from different remote antenna stations; and
  processing means for processing the GPS signal from said antenna stations taking into account said real time calibration of the optical fiber links, thereby obtaining said GPS data.

5. The GPS system according to claim 4, wherein the light modulating means of the light generating module comprise an oscillator generating said oscillating signal.

6. The GPS system according to claim 5, wherein the light modulating means of the light generating module further comprise a light modulator provided downstream said light source and connected to said oscillator, said light modulator modulating an output of the light source according to said oscillating signal.

7. The GPS system according to claim 6, wherein the light source is a laser.

8. The GPS system according to claim 5, wherein said oscillator is directly coupled to said light source.

9. The GPS system according to claims 4, where each antenna station module comprises:
  a beam splitter for separating the optical reference signal into first and second components;
  down converting means for down converting a RF GPS signal received at said antenna station to Intermediate Frequency IF using said first component; and
  modulating means for modulating the second component with the down converted GPS signal to obtain the twice modulated optical signal.

10. The GPS system according to claim 9, wherein the down converting means comprises:
  a light detector for detecting the first component of the optical reference signal and converting the same to an equivalent electrical signal;
  a down converting mixer for mixing the RF GPS signal with said equivalent electrical signal; and
  an amplifier for amplifying the IF GPS signal.

11. The GPS system according to claim 10, wherein the amplifier is a low noise amplifier.

12. The GPS system according to claim 9, wherein the modulating means of each antenna station module comprise a semiconductor optical amplifier, an acousto-optic modulator or an electro-optic modulator.

13. The GPS system according to claim 4, wherein the extracting means for extracting the GPS signal and the oscillating reference signal comprises:
  a detector for detecting the twice modulated optical signal;
  filtering means to filter the twice modulated optical signal.

14. The GPS system according to claim 13, wherein the detector is a photodetector.

* * * * *